No. 645,981. Patented Mar. 27, 1900.
C. G. SPALDING.
DRIP CUP ATTACHMENT FOR REFRIGERATORS.
(Application filed Jan. 20, 1898.)
(No Model.) 2 Sheets—Sheet 1.
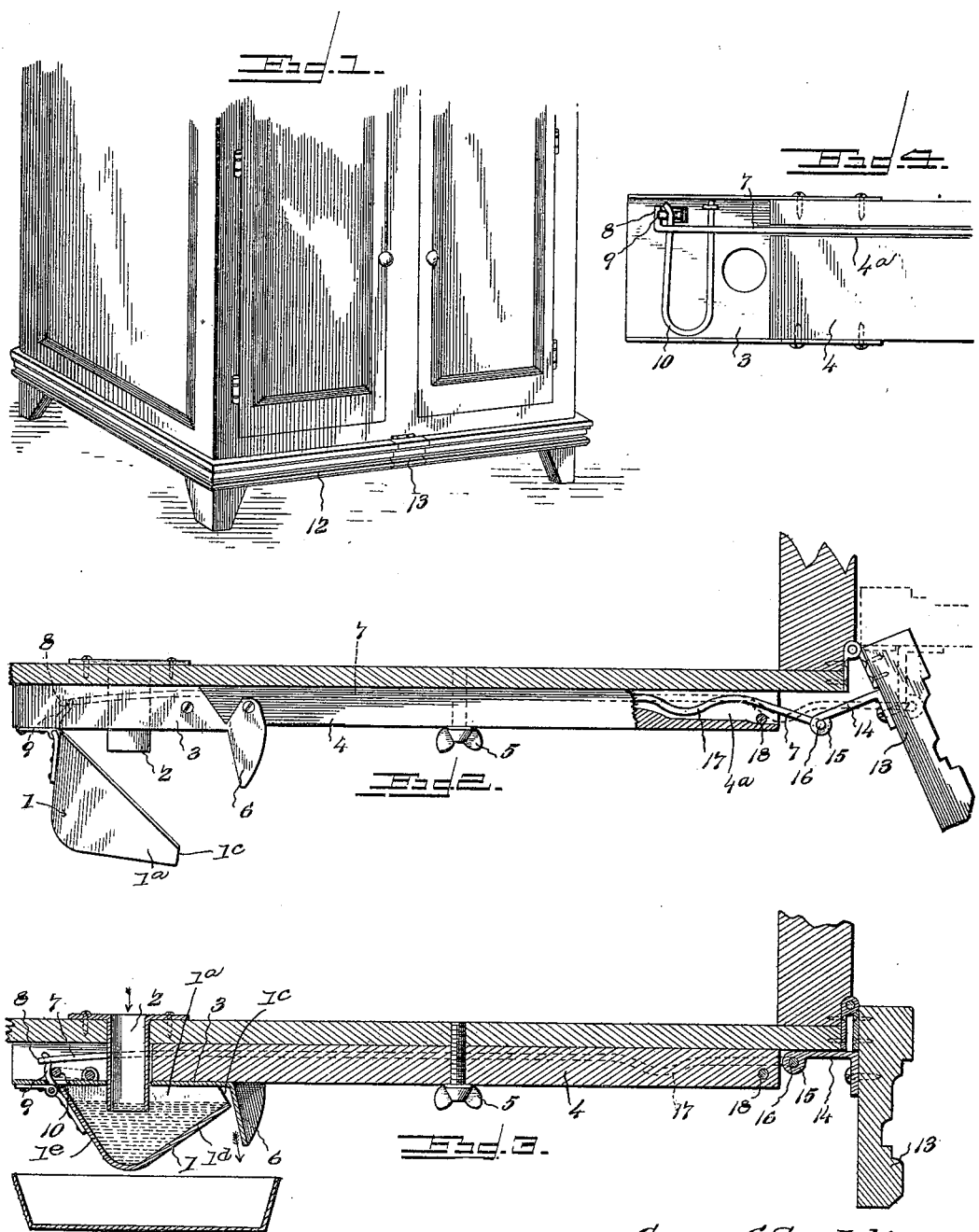
Witnesses 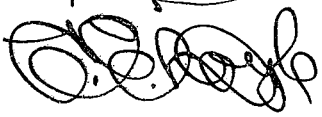
By his Attorneys,
Cyrus G. Spalding
Inventor

No. 645,981. Patented Mar. 27, 1900.
C. G. SPALDING.
DRIP CUP ATTACHMENT FOR REFRIGERATORS.
(Application filed Jan. 20, 1898.)
(No Model.) 2 Sheets—Sheet 2.
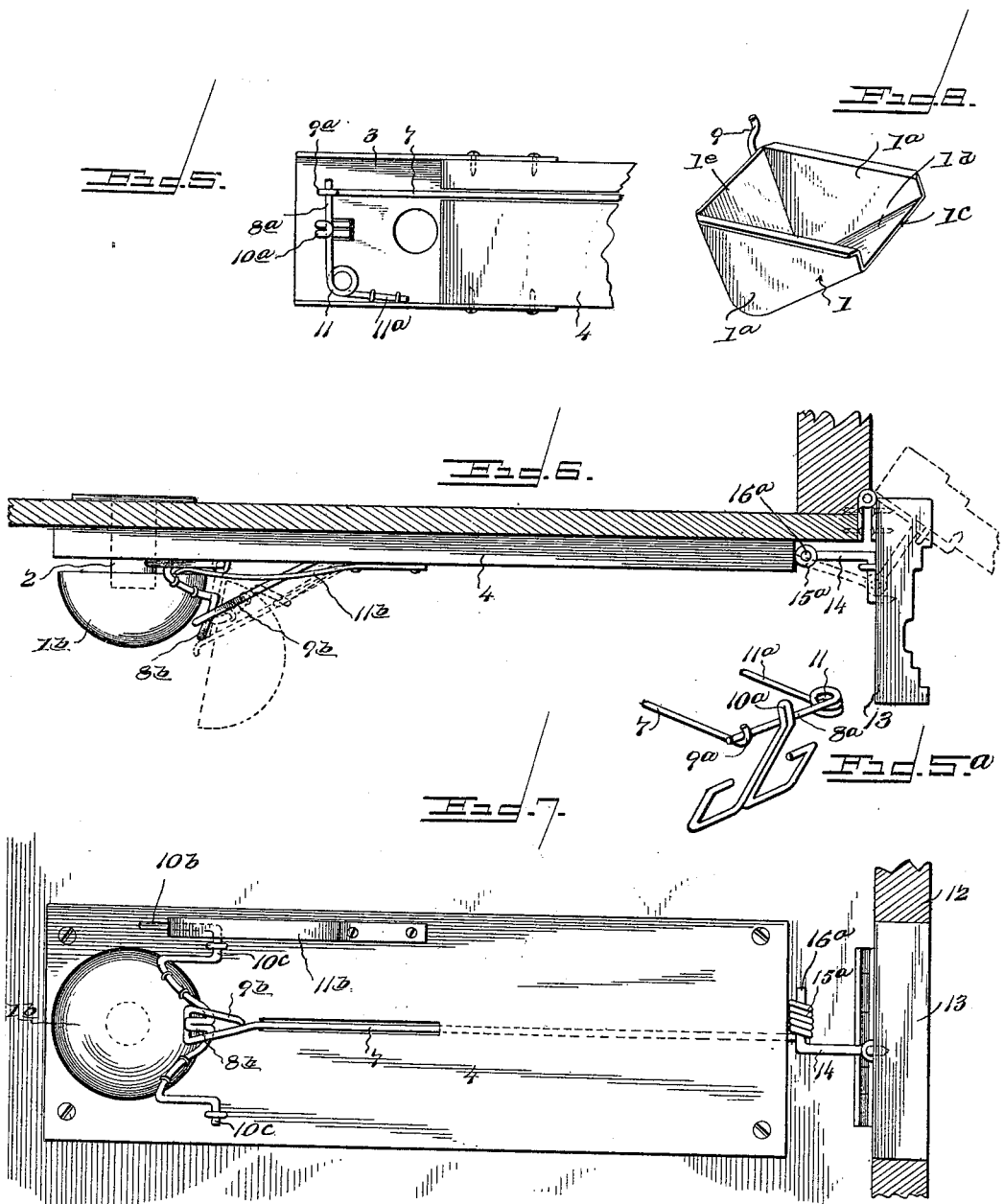

UNITED STATES PATENT OFFICE.

CYRUS G. SPALDING, OF SPRINGFIELD, MASSACHUSETTS.

DRIP-CUP ATTACHMENT FOR REFRIGERATORS.

SPECIFICATION forming part of Letters Patent No. 645,981, dated March 27, 1900.

Application filed January 20, 1898. Serial No. 667,316. (No model.)

*To all whom it may concern:*

Be it known that I, CYRUS G. SPALDING, a citizen of the United States, residing at Springfield, in the county of Hampden and State of Massachusetts, have invented a new and useful Drip-Cup Attachment for Refrigerators, of which the following is a specification.

My invention relates to a drip-cup attachment for refrigerators, and has for one object to provide a drip-cup or trap for the waste-pipes of refrigerators, whereby the discharge of the contents thereof is facilitated, the means by which the tilting of the drip-cup or trap is accomplished consisting of a movable portion of the front molding or skirting of the refrigerator-casing, and hence conforming accurately to and being let into the face of the casing, so as not to detract from the ornamental appearance thereof.

A further object of the invention is to provide a detachable or releasing connection between the drip-cup and the movable skirting or molding section, whereby the drip-cup or trap is first tilted to discharge its contents and is then released for return by yielding constantly-operating means, such as a spring-hinge, to its normal position.

A further object of the invention is to provide a deflector or guard, whereby the splashing of the contents of the drip-cup or trap as it is tilted may be prevented.

A further object of the invention is to provide means whereby the overflow from the drip-cup or trap is conducted properly into the subjacent receptacle without splashing and also whereby a receptacle of small diameter may be employed without the risk of overflow from the cup being deposited outside of the periphery thereof.

A further object of the invention is to provide means whereby the device consisting of the drip-cup and coöperating parts may be detachably secured to a refrigerator-casing to facilitate removal for cleansing and analogous purposes.

Further objects and advantages of this invention will appear in the following description, and the novel features thereof will be particularly pointed out in the appended claims.

In the drawings, Figure 1 is a perspective view of a portion of a refrigerator having a drip-cup attachment constructed in accordance with my invention. Fig. 2 is a side view of the attachment, showing the contiguous portion of the refrigerator-casing in section, the drip-cup being shown in its discharging position. Fig. 3 is a longitudinal section of the attachment, the drip-cup being shown in its normal position. Fig. 4 is a plan view of a portion of the attachment detached from the refrigerator-casing. Fig. 5 is a plan view of a slightly-modified form of the operating mechanism, wherein the draw-rod is connected with the spring-arm. Fig. 5$^a$ is a detail view in perspective of adjacent portions of the operating-rod, a spring-actuated arm, and a stud which is carried by the cup. Fig. 6 is a side view of another modified form of the drip-cup-operating mechanism wherein the cup discharges at its rear edge. Fig. 7 is an inverted plan view of the same. Fig. 8 is a detail view of the form of drip-cup illustrated in Figs. 2 to 5.

Similar reference characters indicate corresponding parts in all the figures of the drawings.

The drip-cup 1 is pivotally or hingedly mounted for swinging movement in a vertical plane and is adapted when in its elevated or normal position to receive the lower discharge end of the drip-tube 2, which may be of the ordinary construction, such as those employed in the present practice in connection with refrigerators of various types, it being understood that the construction of the refrigerator has no bearing upon my present invention, as I have aimed to devise a drip-cup attachment which may be applied to any ordinary form of refrigerator-casing. The drip-cup preferably closes snugly against a fastening-plate 3, which may be attached to or formed as part of a base-plate or strip 4, adapted to be secured to the under surface of the bottom of a refrigerator-casing, as illustrated, the means which I have shown for securing this base-plate or strip in place consisting of a thumb-screw 5. The drip-cup preferably consists of vertical side walls 1$^a$ and downwardly-convergent front and rear walls 1$^d$ and 1$^e$, which converge into a rounded bottom, whereby in longitudinal vertical section the drip-cup is essentially V-shaped, this construction adapting it to discharge its contents when tilted through an angle of comparatively few degrees. The front or free edge of the cup is preferably cut away or slightly depressed, as shown at $1^c$, to occupy a position in a plane lower than the upper edges of the side and rear walls, and contiguous to the free edge of this front wall is arranged a deflector or guard 6, which, being located in the path of overflow from the cup, serves to conduct it in a vertically-downward direction and prevent water from flowing down the inclined front wall of the cup. Furthermore, this deflector serves to prevent splashing the contents of the cup when the latter is depressed or tilted.

The base-plate or strip in addition to carrying the drip-cup is channeled, as at $4^a$, to form a guide or bearing for an operating or draw rod 7, which extends longitudinally of the strip and has connection with the drip-cup, whereby when the rod is drawn forward the free edge of the drip-cup is depressed. Various forms of connection between the operating-rod and the drip-cup may be employed; but in practice I prefer to employ such a connection that when the operating-rod has been drawn forward a sufficient distance to depress the drip-cup beyond that point at which it is adapted to drain freely the drip-cup will be released and allowed to return to its normal or elevated position by the force of a spring-hinge or other yielding actuating device. This releasing connection between the operating-rod and the drip-cup may be accomplished by providing the former with a catch, offset, projection, hook, or shoulder to engage a yielding spring-actuated arm either carried by or connected with the drip-cup. In the construction illustrated in Figs. 1 to 4, inclusive, the draw-rod is provided with a terminal offset or stud 8 for engagement with a yielding spring-actuated arm 9, which is carried directly by the drip-cup, said arm being in contact with a spring-arm 10, by which the cup is yieldingly held in its normal position. When the operating-rod is drawn forward by the means provided for that purpose, (and hereinafter described,) the tilting or inclination of the yielding arm gradually withdraws it from the path of the offset or stud of the operating-rod and finally is disengaged therefrom to allow the prompt return of the drip-cup to its normal position. The rearward or return movement of the operating-rod reëngages its offset hook or stud with the arm 8.

In the construction illustrated in Fig. 5 the yielding spring-actuated arm $8^a$ is arranged in the path of the offset or stud $9^a$ on the rear end of the operating-rod, said arm $8^a$ having an extension forming a spring-coil 11 and a fixed attaching-arm $11^a$. This yielding arm $8^a$ has a rearward tendency, and in the path thereof is arranged an arm $10^a$, carried by the drip-cup, and the effect of the arm $8^a$ upon the arm $10^a$ is to yieldingly hold the last-named arm in its normal position and the drip-cup in its receiving position. This arrangement of parts, however, does not constitute a releasing connection between the operating-rod and the drip-cup. On the other hand, in the construction illustrated in Figs. 6 and 7, wherein the drip-cup $1^b$ is depressible at its rear edge to discharge accumulations therein, the operating-rod is provided with an offset $9^b$, consisting of the outer transversely-disposed end of a loop, while the yieldingly-actuated arm $8^b$, which consists of a loop or bail, is carried directly by the drip-cup, and when the operating-rod is drawn forward a sufficient distance its transverse portion or offset slips from the extremity of said arm $8^b$ and allows the cup to be returned to its elevated or normal position by the tension of an actuating-spring $11^b$, which terminally bears upon a crank-arm $10^b$, formed as an extension of one of the drip-cup trunnions $10^c$.

Let into and preferably forming a part of the bottom molding or skirting 12 of the refrigerator-casing is a movable skirting-section 13, hinged at its upper edge to the casing and adapted to be swung forwardly and upwardly at its free lower edge, and to this movable molding-section, which constitutes an apron, is pivotally connected the front end of the operating or draw rod, this feature being common to all of the forms of drip-cup-operating devices illustrated in the drawings. The effect of this connection is that when it is desired to discharge the contents of the drip-cup it is simply necessary to draw the free lower edge of the swinging apron or skirting forward either by hand or by the application of pressure by the toe of the shoe or otherwise. The apron is preferably hinged above the plane of the draw-rod, and projecting inwardly or rearwardly from the apron is a bracket-arm 14, having, for instance, as in Figs. 2 and 3, an eye or bearing 15, in which a lateral extension 16 of the draw-rod is engaged. The rear or bearing end of this bracket-arm, by reason of the relative arrangement of the apron-hinge and the bracket, travels in a path which is approximately in alinement with the draw-rod or varies but slightly from a path in alinement therewith in order to avoid bending the rod; but in order that the apron may be temporarily locked in the elevated position illustrated in dotted lines in Fig. 2 I preferably provide a stop or equivalent means for checking return movement of the connecting-rod. In the construction illustrated in Figs. 1 to 4 frictional contact between the rod and the guide-bearing is attained by providing the rod with an offset or bowed portion 17 and arranging a stop or friction-pin or bearing-pin 18 in the path thereof. This bowed offset occupies a position upon one side or the other of the bearing-pin, according to whether the movable section of the molding or skirting is in its normal or elevated position.

In Figs. 6 and 7 of the drawings the rod 7 is provided with an eye $15^a$, in which fits a lateral extension $16^a$ on the bracket 14, thus constituting a reversal of the connection employed for uniting the corresponding parts illustrated in Figs. 2 and 3.

An advantage of the releasing connection between the drip-cup tilting or depressing devices and the cup resides in the fact that it prevents straining the means whereby the drip-cup is mounted and also insures the return of the drip-cup to its normal position to catch drippings from the tube of the refrigerator while the usual waste-receptacle, which is normally disposed under a refrigerator to catch the drippings, is being emptied.

The above-described specific construction of drip-cup, involving downwardly and inwardly inclined front and rear walls, has the advantage in practice of providing for the prompt discharge of the contents of the cup without necessitating a movement thereof through a considerable angle, the inclination of the rear wall serving to bring the weight forward or arrange the center of gravity in advance of the plane of the trunnions, whereby the tilting operation is accomplished without straining the elements of the mechanism. Furthermore, it will be seen that the movable section of the skirting or apron forms a convenient grip or handle by means of which the cup may be tilted; but the special advantage in attaching the draw-rod to the skirting is that the cup may be tilted to discharge its contents by catching the toe of the foot upon the lower edge of the apron and drawing the same outward, whereby the operator may discharge the contents of the drip-cup without stooping and manually grasping the skirting or handle. The releasing action or detaching connection between the draw-rod and the cup provides for this operation by means of the foot without risking the straining of the elements, for the reason that when the skirting has been drawn out to a certain point the drip-cup will be released or detached from the other members of the mechanism and will be returned to its normal position by an actuating-spring. Furthermore, from the foregoing description it will be seen that I have provided in connection with the drip-cup a spring-hinge for supporting the same and a connecting-rod which is supported in guide-bearings beneath the refrigerator and skirting hinged to the base of the refrigerator and to which the connecting-rod is pivotally attached, said connecting-rod being formed with a hook-shaped end adapted for engagement with an arm, loop, or bail on the drip-cup, and, furthermore, that I have provided in connection with the above parts a stop whereby the skirting is held in a raised position after having been drawn forward to discharge the contents of the drip-cup.

Various changes in the form, proportion, size, and minor details of construction within the scope of the appended claims may be resorted to without departing from the spirit or sacrificing any of the advantages of the invention.

Having described my invention, what I claim is—

1. A refrigerator having a drip-cup provided with yielding actuating devices for maintaining it in its normal position, a movable apron or skirting section mounted upon the refrigerator-casing, and releasing connections between the apron and the drip-cup, whereby when the apron is actuated the cup is moved a limited distance and is then released for automatic return to its normal position, substantially as specified.

2. A refrigerator having a drip-cup provided with yielding actuating devices for maintaining it in its normal position, a hinged molding or skirting section mounted upon the refrigerator-casing, and a draw-rod permanently connected at its front end with the molding-section and having a releasing connection with the drip-cup, to move the latter a limited distance and then release the same, substantially as specified.

3. A refrigerator having a drip-cup provided with yielding actuating devices for maintaining it in its normal position, a draw-rod provided with a suitable grip whereby it may be operated, and a releasing connection between the draw-rod and the drip-cup, whereby when the draw-rod is actuated, it moves the drip-cup a limited distance and then releases the same for automatic return to its normal position, substantially as specified.

4. A refrigerator having a drip-cup provided with yielding actuating devices for maintaining it in its normal position, a movable apron mounted upon the refrigerator-casing, a draw-rod connected at its front end with the apron and having at its rear end a releasing connection with the drip-cup, and means for frictionally engaging and temporarily holding the apron in its adjusted position, substantially as specified.

5. A refrigerator having a drip-cup provided with yielding actuating devices for maintaining it in its normal position, an apron mounted to swing upon the refrigerator-casing, a draw-rod connected at its front end with the apron and having a releasing connection at its rear end with the drip-cup, and a holding device consisting of a bearing-pin arranged in the path of a bowed offset in the draw-rod, for frictionally holding the apron in its adjusted position, substantially as specified.

6. A refrigerator having a drip-cup provided with yielding actuating devices for maintaining it in its normal position, a draw-rod provided at its front end with a handle or grip and having at its rear end a releasing connection with the drip-cup, and means for frictionally engaging and temporarily holding the draw-rod in its adjusted position, substantially as specified.

7. A refrigerator having a drip-cup hinged at one end, a deflector or guard disposed contiguous to the free end of the cup, and means for actuating the drip-cup, substantially as specified.

8. A refrigerator having a drip-cup hinged at one end for depression at the opposite end, the wall at the free end of the drip-cup being slightly depressed, a deflector or guard arranged in the path of overflow escaping over the depressed portion of the wall of the drip-cup, and means for actuating the drip-cup, substantially as specified.

9. A movable drip-cup for refrigerators, in combination with a spring-actuated, drip-cup-operating arm, and a draw-rod having a releasing connection with said arm, whereby, when the rod is actuated, it moves said arm a limited distance to discharge the contents of the drip-cup and then releases it for automatic return to its normal position, substantially as specified.

10. A refrigerator having a drip-cup, means, including a movable arm, for discharging the contents of the drip-cup, said arm being automatically returnable to its normal position when released, and a draw-rod having a releasing connection with said arm, substantially as specified.

11. A refrigerator having a tilting drip-cup, means, including a movable arm, for tilting the drip-cup to discharge its contents, said arm being automatically returnable to its normal position when released, and a draw-rod having a releasing connection with said arm, substantially as specified.

12. A refrigerator having a drip-cup, a spring-actuated, drip-cup-operating arm, and a draw-rod provided with an offset having a releasing engagement with said arm, substantially as specified.

13. A refrigerator having a drip-cup mounted for swinging movement, and having a rigid operating-arm attached thereto and swinging therewith, and a draw-rod mounted to slide in a plane parallel with said arm, and tangential to the path thereof, and provided with a lateral offset in the path of which said arm is normally arranged, the arm being adapted to swing out of the path of the offset, substantially as specified.

14. A refrigerator having a pivoted drip-cup provided with an arm, yielding means for actuating said arm, and an operating-rod having a lateral offset in the path of which said arm is normally arranged, substantially as specified.

15. A drip-cup attachment for refrigerators, the same having a base-plate or strip and means for removably attaching the same to a refrigerator-casing, and a drip-cup and operating devices mounted thereon, substantially as specified.

16. A drip-cup attachment for refrigerators having a channeled base-plate or strip provided contiguous to one end with an opening for a refrigerator drip-tube, a drip-cup hingedly mounted upon said plate or strip, a draw-rod mounted to slide in a channel of the plate or strip, and operating connections between the rear end of the draw-rod and the drip-cup, substantially as specified.

17. The combination of the drip-cup, the spring-hinge supporting the same, connecting-rod supported in guide-bearings beneath the refrigerator, and the skirting hinged to the base of the refrigerator and to which the connecting-rod is pivotally secured, substantially as specified.

18. The combination of the drip-cup, the spring-hinge supporting the same in position, the loop or bail at the bottom thereof, the rod formed with the hook-shaped end, the skirting to which said actuating-rod is pivotally secured and the stop for holding the skirting in its raised position, substantially as specified.

19. The combination with a drip-cup, a spring-hinge supporting the same, a connecting-rod supported in guide-bearings beneath the refrigerator, a skirting hinged to the base of the refrigerator, and to which the connecting-rod is pivotally secured, and a stop for holding the skirting in its raised position, substantially as specified.

In testimony that I claim the foregoing as my own I have hereto affixed my signature in the presence of two witnesses.

CYRUS G. SPALDING.

Witnesses:
  GEORGE HOWLETT,
  CHARLES ROGERS.